Patented Apr. 29, 1952

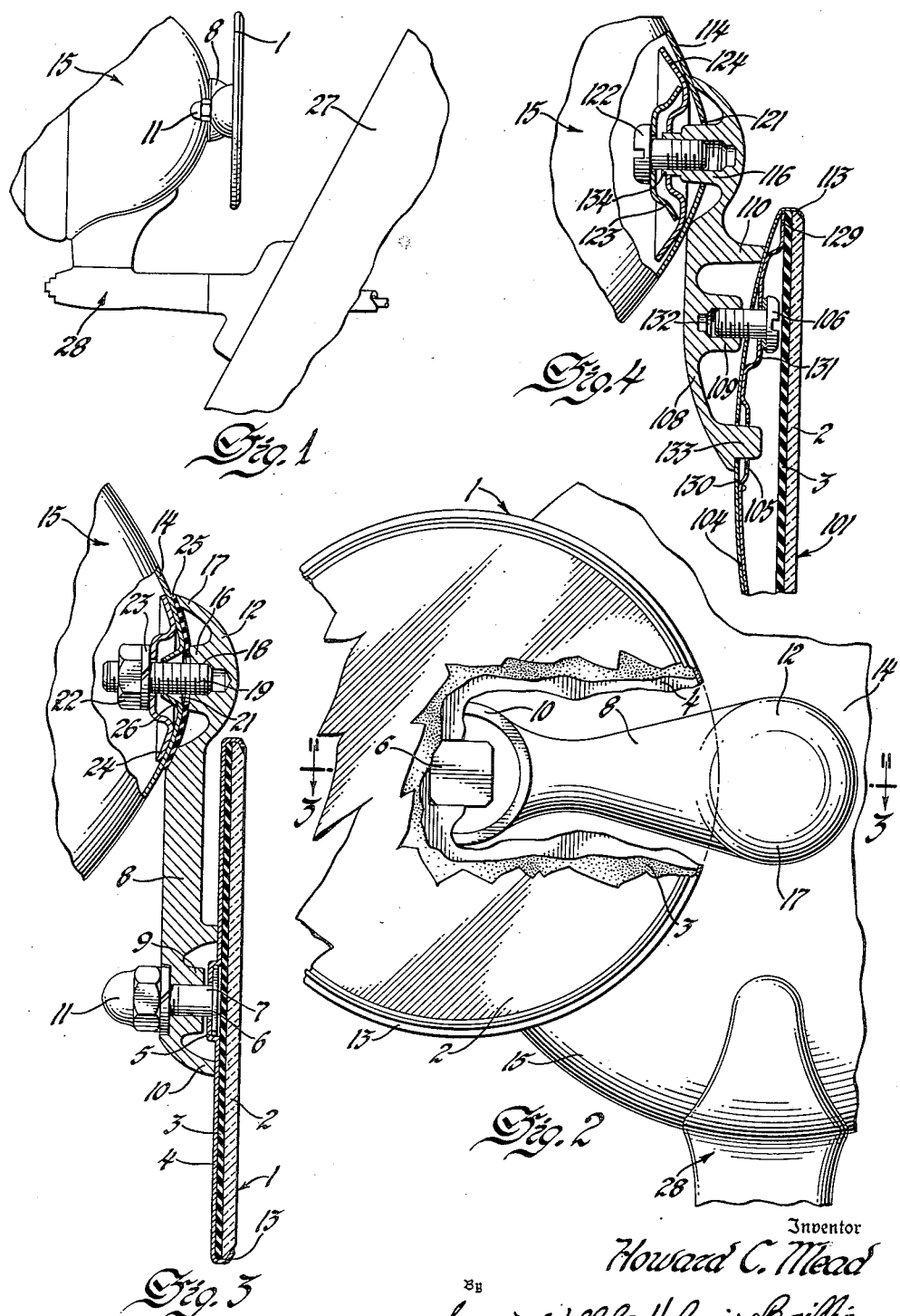

2,594,784

UNITED STATES PATENT OFFICE 2,594,784

SPOTLIGHT ATTACHMENT FOR MIRRORS

Howard C. Mead, Anderson, Ind., assignor to General Motors Corporation, Detroit, Mich., a corporation of Delaware Application May 14, 1948, Serial No. 27,071

4 Claims. (Cl. 240—7.1)

This invention relates to spot lamps and rear view mirrors of the type used on automotive vehicles and the like, and particularly to means for mounting a rear view mirror to a spot lamp.

A spot lamp mounted externally on the side of a vehicle affords a very satisfactory supporting base for a rear view mirror, because since both require approximately the same location on the vehicle for greatest convenience to the operator such an arrangement eliminates the necessity of separate supporting brackets extending outward from the frame of the vehicle. Further, with the spot lamp mounted dirigibly and controllable from inside the operator's compartment, this arrangement permits using the spot lamp control means for adjusting the mirror position when the lamp is not in use.

However, since the most convenient height of the mirror location will vary somewhat as between operators of different bodily heights, it is desirable that the mirror be adjustable in height relative to the vehicle. Also, it is desirable from a production and sales standpoint that the spot lamp be so designed that the provision for attachability of the mirror does not detract from the pleasing external appearance of the lamp, thereby allowing for both the sale of the spot lamp separately and for possible subsequent removal of the mirror by the purchaser of a spot lamp with mirror attached.

A principal object therefore of this invention is to provide an improved means for attaching a rear view mirror to a spot lamp, which means possesses important advantages in manufacturing economy, simplicity of assembly, and pleasing external appearance.

A further object of the invention is to provide an improved means for attaching a rear view mirror to a spot lamp, which means allows for adjustment of the height of the mirror relative to the spot lamp.

A still further object of the invention is to provide an improved means for attaching a rear view mirror to a spot lamp, which means allows for attachment and subsequent removal of the mirror without resultant detraction from the original pleasing external appearance of the lamp.

The invention including other objects and advantages thereof will be fully understood from the following description, together with the drawings in which:

Figure 1 is a fragmentary side elevation of a spot lamp and rear view mirror embodying my invention, shown dirigibly mounted to the frame of an automotive vehicle body.

Figure 2 is an enlarged fragmentary rear elevation of the lamp and mirror of Figure 1, with portions of the mirror broken away to bring other parts into view.

Figure 3 is a section taken substantially on line 3—3 of Figure 2.

Figure 4 is a view similar to Figure 3 but showing a modified construction of the mirror and the means for attaching the same to a spot lamp.

As shown in Figures 1 to 3 of the drawings, the mirror 1 comprises a sheet 2 of transparent material such as glass and of circular or other outline, having its inner surface coated with a light reflecting medium and painted in conventional manner, and backed by a gasket 3 and a reinforcement member or shell 4, the sides 13 of the latter being crimped around the outer edges of the gasket 3 and glass sheet 2 to seal and protect the same. In forming the shell 4, an apertured rectangular or other non-circular shaped depression or housing 5 is provided centrally thereof to accommodate the similarly shaped head 6 of a threaded bolt 7, which is installed prior to the aforesaid crimping operation.

The mirror 1 is secured by the bolt 7 to one end of an arm 8 which is provided with two concentric annular bosses 9 and 10, the inner boss 9 being apertured for passage of the bolt 7, and the outer boss 10 over-extending the inner boss by an amount slightly greater than the depth of the depression 5 in order to provide an abutment for the shell 4 when the latter is tightened against the arm by drawing up a nut 11 on the bolt 7.

The opposite end 12 of the arm 8 is provided with concentric inner and outer annular bosses 16 and 17, generally similar in form to the bosses 9 and 10 but disposed on the opposite side of the arm 8, with the inner boss 16 having a threaded blind hole 18 centrally therein from which extends a stud 19 for securing the arm 8 to the casing 14 enclosing the rear end of the spot lamp 15. The outer boss 17 over-extends the inner boss 16 sufficiently to enable the former to press slightly heavier on the curved surface of the lamp casing 14 when assembled thereto than does the inner boss 16.

The lamp casing 14 has an aperture 21 for passage of the stud 19 which is journaled therein and held by a nut 22 drawn up against a lock washer 23 and a cup-shaped washer 24, which latter in turn bears against the inner surface of the lamp casing 14. A washer or gasket 25 of soft rubber or other suitable resilient material may be placed between the lamp casing 14 and the bosses 16 and 17 on the arm 8 to seal against the entrance of moisture into the aperture 21, and to provide a suitable frictional resistance against relative movement between the arm 8 and lamp casing 14 except during manual adjustments of the mirror height.

A relatively tight threaded engagement of the stud 19 is employed both in the boss 16 and in the nut 22, in order to insure against the stud turning relative to either of those parts when the arm is moved relative to the spot lamp in making adjustments of mirror height.

Since it may be desired to use the spot lamp 15 without the mirror 1 and arm 8 attached thereto, provision therefore is made in the forming of the lamp casing 14 to permit closing the aperture 21 with an oval-shaped screw or bolt (not shown). For this purpose the material of the lamp casing 14 surrounding the aperture 21 is extended inwardly as shown at 26 to provide a conical seat for the head of an oval-headed screw or bolt.

As shown in Figure 1 the spot lamp 15 is preferably dirigibly mounted to the vehicle body frame 27 through any convenient means, indicated generally at 28, which will enable the operator to adjust the angular position of the spot lamp (and alternatively the rear view mirror 1, by reason of its attachment to the spot lamp) from within the vehicle body. The mirror 1 being adjustable in height relative to the vehicle by swinging the arm 8 relative to the spot lamp, can thereby be positioned to properly suit the convenience of vehicle operators of substantially different body heights.

In Figure 4 is shown another preferred embodiment of the invention, having certain functional and manufacturing advantages over that previously described. The back of the mirror 101 comprising the coated glass sheet 2 and gasket 3 is enclosed by an outer shell 104 and an inner stiffening member or spacer 130. The shell 104 is dished as shown to provide a convex outer surface to the back of the mirror for a pleasing external appearance, and the peripheral portions 113 are bezelled around the glass sheet 2. The spacer member 130 is also dished to conform to the concave inner surface of the shell 104, except for a flat annular portion 129 adjacent its periphery where it presses against the gasket 3, and two flat portions 105 and 131 located approximately centrally of the mirror and at a point radially outward therefrom respectively. Aligned apertures are provided in the shell 104 and spacer 130 at the flat portions 105 and 131.

The arm 108 securing the mirror to the spot lamp is generally similar to the arm 8 previously described but differs at the mirror end in that the inner boss 109 is provided with a blind threaded hole 132 instead of a through aperture, and the outer boss 110 is provided with a projection 133 which engages with the shell 104 and flat portion 105 of the spacer through the aligned apertures therein. A screw 106 extending through the apertures in the shell 104 and flat portion 131 of the spacer is threadedly secured in the hole 132 of the inner boss 109. With this construction the mirror 101 is locked against rotation relative to the arm 108 during movements of the latter in making adjustments of the mirror height.

The spot lamp end of the arm 108 differs from that of the previously described arm 8 in that the inner boss 116, which is circular in cross-section, is increased in length so that it extends through and journals in the aperture 121 provided in the rear end of the lamp casing 114. The projecting end of the boss 116 has a further concentric extension 134 which may be of somewhat smaller diameter and which journals in the aperture of the washer 124. The arm is held against the lamp casing by a screw 122 threadedly engaging the inner boss 116 and drawn up against a cup-shaped washer 123 which in turn resiliently bears against the washer 124. A tight threaded fit is provided between the screw 122 and the inner boss 116 to insure against their relative turning during rotation of the arm 108 about the lamp casing.

In the embodiment shown in Figure 4, should it be desired to use the spot lamp without the mirror attached the aperture 121 in the lamp casing 114 may be conveniently closed by a snap plug (not shown) of conventional form.

The heretofore described means for attaching a rear view mirror to a spot lamp are not only cheap and simple to produce, but additionally afford obtaining a pleasing external appearance of the spot lamp and mirror in combination. Further, the invention obtains these results without requiring any appreciable change in the structure or appearance of the spot lamp per se, that is where the latter is to be sold without the mirror attached or where the mirror is subsequently to be removed from the spot lamp.

I claim:

1. In combination, a mirror body including a mirror element, an outer shell having an outwardly dished portion enclosing the back of the element and edge portions forming a bezel around the periphery of the element, and a spacer member between the back of the element and the dished portion of the shell; said shell and spacer member having two pairs of aligned apertures; an arm extending transversely to the mirror axis externally of the shell and having a boss conforming in curvature to the outer surface of the dished portion of the shell; means extending through one of said pairs of aligned apertures for clamping the mirror body to the arm and means integral with said boss and extending through the other pair of apertures for locking the mirror body against relative rotation with the arm; a second boss adjacent the opposite end of the arm and on the opposite side thereof from the mirror; a spot lamp having a casing enclosing its rear end and provided with an aperture; said second boss conforming in curvature to the curvature of the lamp casing circumferentially about the aperture in the latter; a portion integral with the arm and journaled in the aperture in the casing; and means within the lamp casing and secured to the said integral portion for clamping said second boss against the lamp casing.

2. Means for rotatively mounting a rear view mirror on a spot lamp casing comprising: a mirror element, an outer support shell for said mirror with two apertures therein, a mounting arm having on one end a boss conforming in curvature to the outer surface of said mirror shell, means extending through one of said apertures for clamping said arm to said mirror shell, said boss having a portion extending through said other aperture for locking the mirror shell against rotation relative to the arm; a spot lamp casing provided with an aperture therein, a boss on the other end of said arm conforming in curvature to the surface of said casing adjacent to the aperture, a portion integral with said arm and journaled in the casing aperture, said boss and said portion providing bearing surfaces between said arm and said shell, radially spaced with respect to the axis of said integral portion and means within said casing secured to said integral portion for clamping said last mentioned boss against the casing.

3. Means for attaching a rear view mirror to a spot lamp, including a casing enclosing the rear end of the spot lamp and provided with an aperture therein, an arm extending transversely from the rear end of the lamp casing, said arm having an integrally formed annular boss in close fitting abutment with the external surface of said casing spacedly concentric with said aperture, a second boss formed integrally with the arm and journaled in the aperture, means within the casing and in combination with said second boss for clamping said annular boss in tight frictional engagement with the external surface of the casing, whereby said arm may be rotatively adjusted with respect to the spot lamp casing, and means for attaching to said arm a rear view mirror so that the mirror can be rotated on an axis about the spot lamp casing.

4. Means for rotatively mounting a rear view mirror on a spot lamp casing comprising: a mirror element, a backing shell for said mirror having two apertures therein, a mounting arm having on one end a boss conforming in curvature to the outer surface of said backing shell, means extending through one of said apertures for clamping said arm to said backing shell, said boss having a portion extending through said other aperture whereby the mirror backing shell is locked against rotation relative to said mounting arm, and means for rotatively attaching the other end of said mounting arm to the spot lamp casing.

HOWARD C. MEAD.

REFERENCES CITED

The following references are of record in the file of this patent:

UNITED STATES PATENTS

| Number | Name | Date |
|---|---|---|
| 1,237,524 | Kaufmann | Aug. 21, 1917 |
| 1,308,182 | Leuckert | July 1, 1919 |
| 1,309,714 | Anderson | July 15, 1919 |
| 1,361,434 | Anderson | Dec. 7, 1920 |
| 1,803,433 | Martinek | May 5, 1931 |
| 1,909,526 | Falge | May 16, 1933 |
| 2,119,654 | Stone | June 7, 1938 |
| 2,456,362 | Aves | Dec. 14, 1948 |